Patented Apr. 17, 1923.

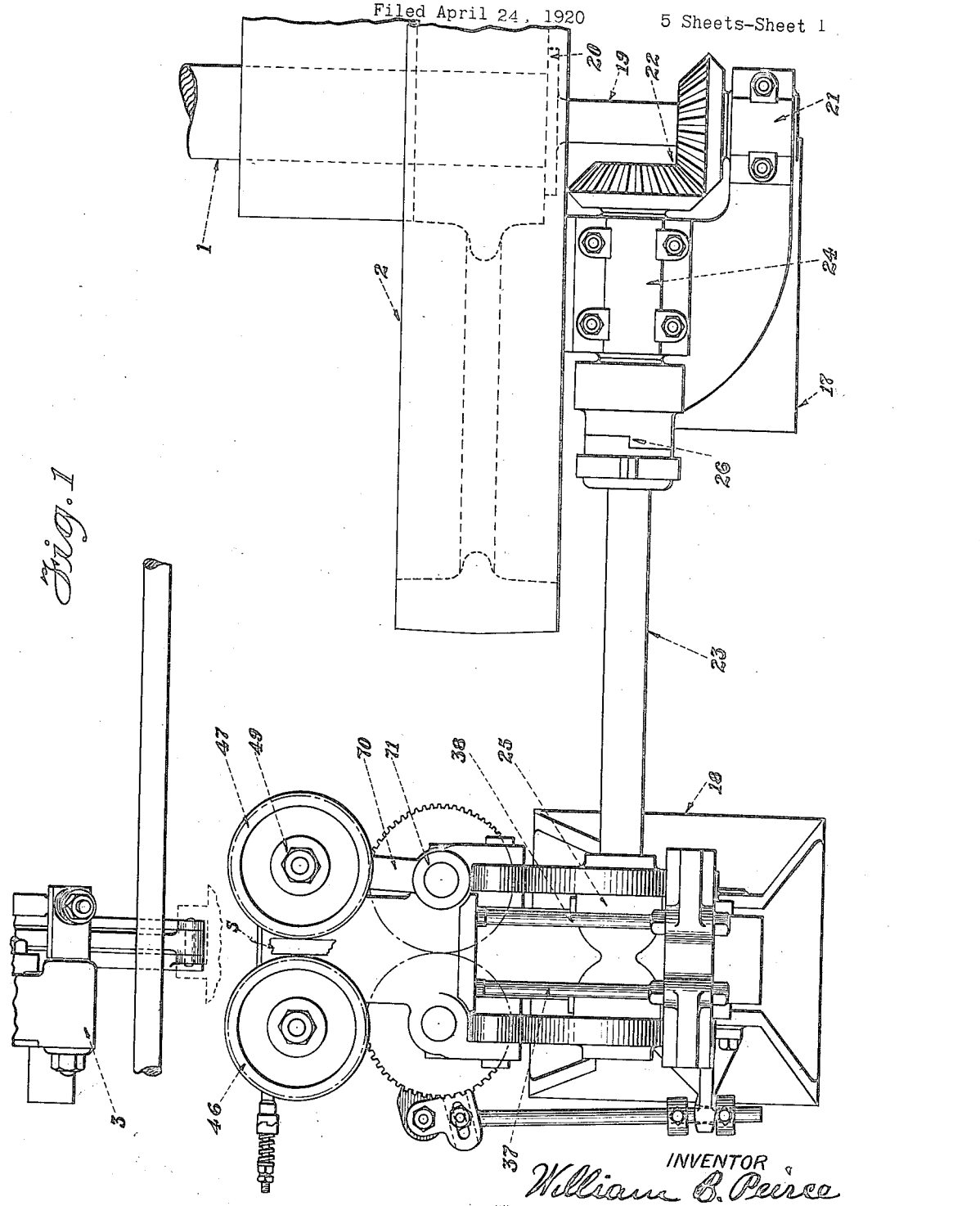

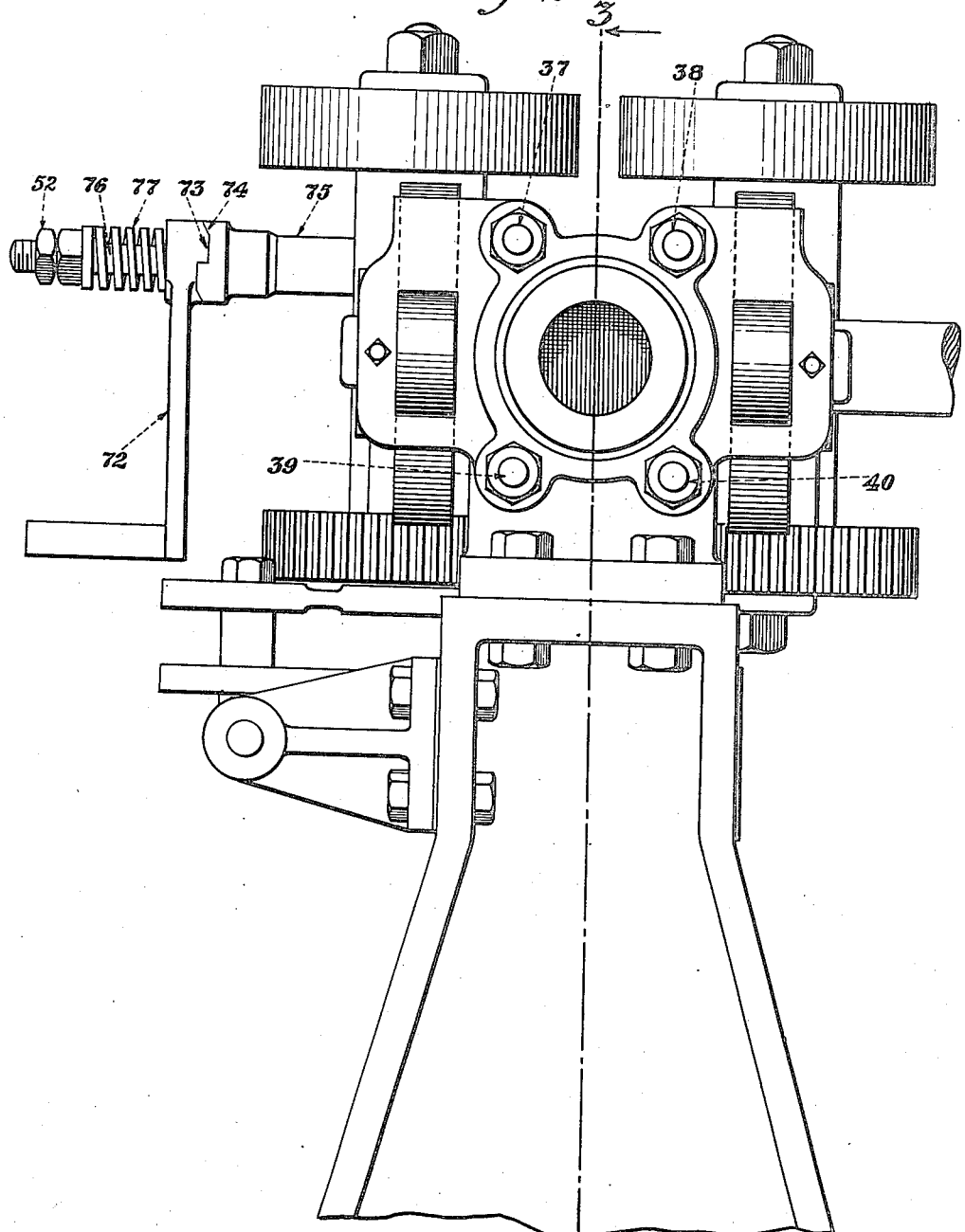

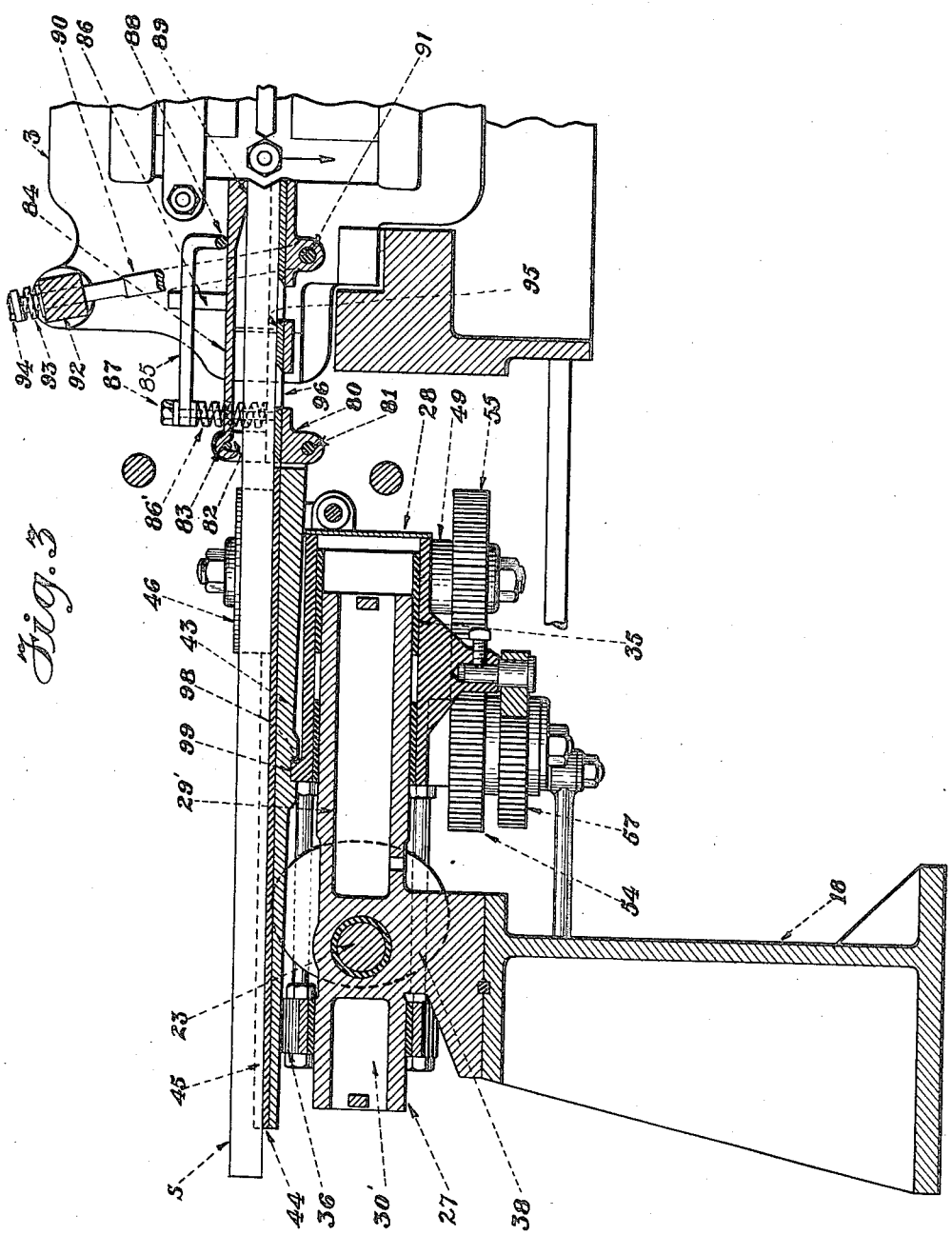

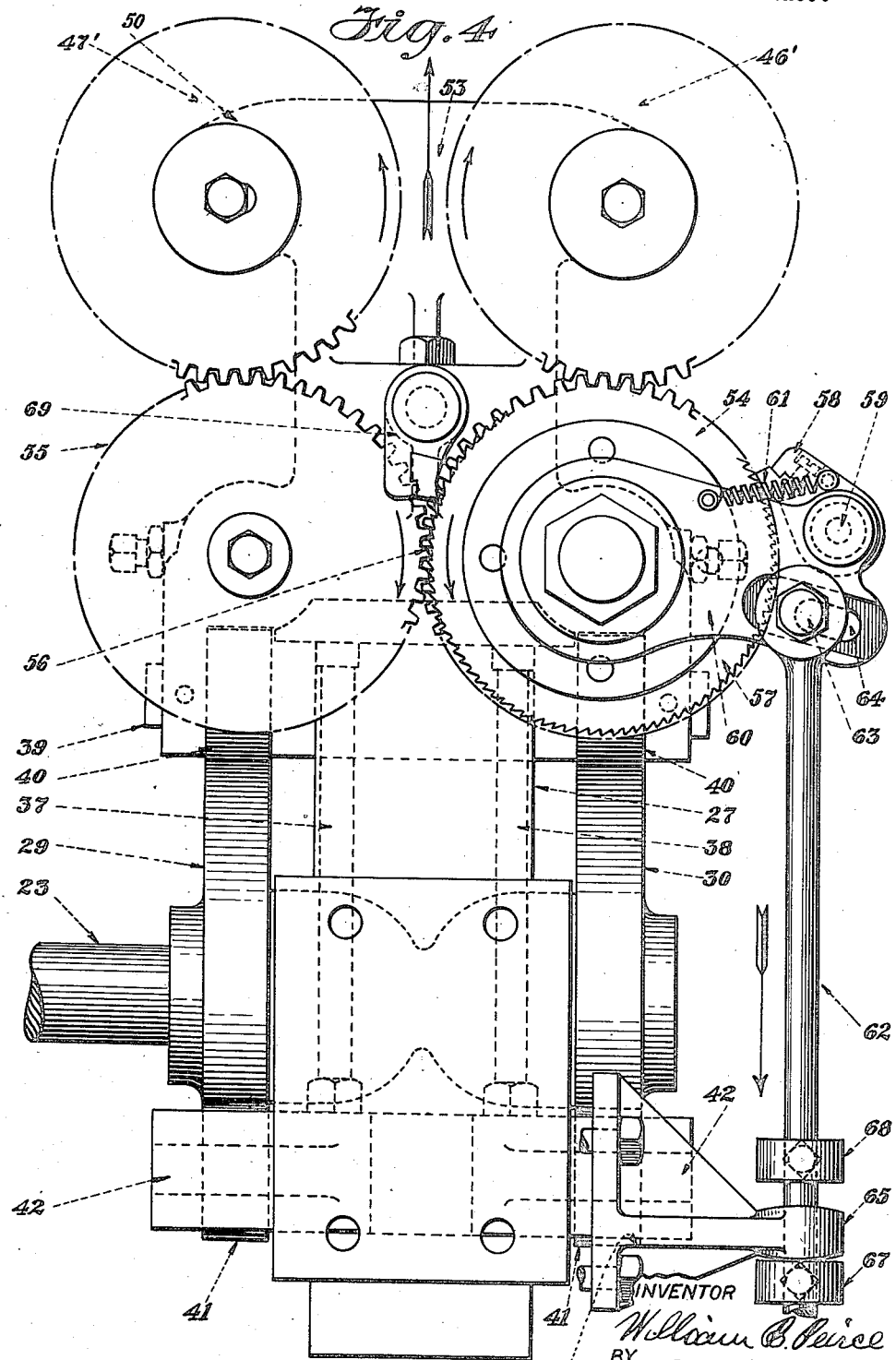

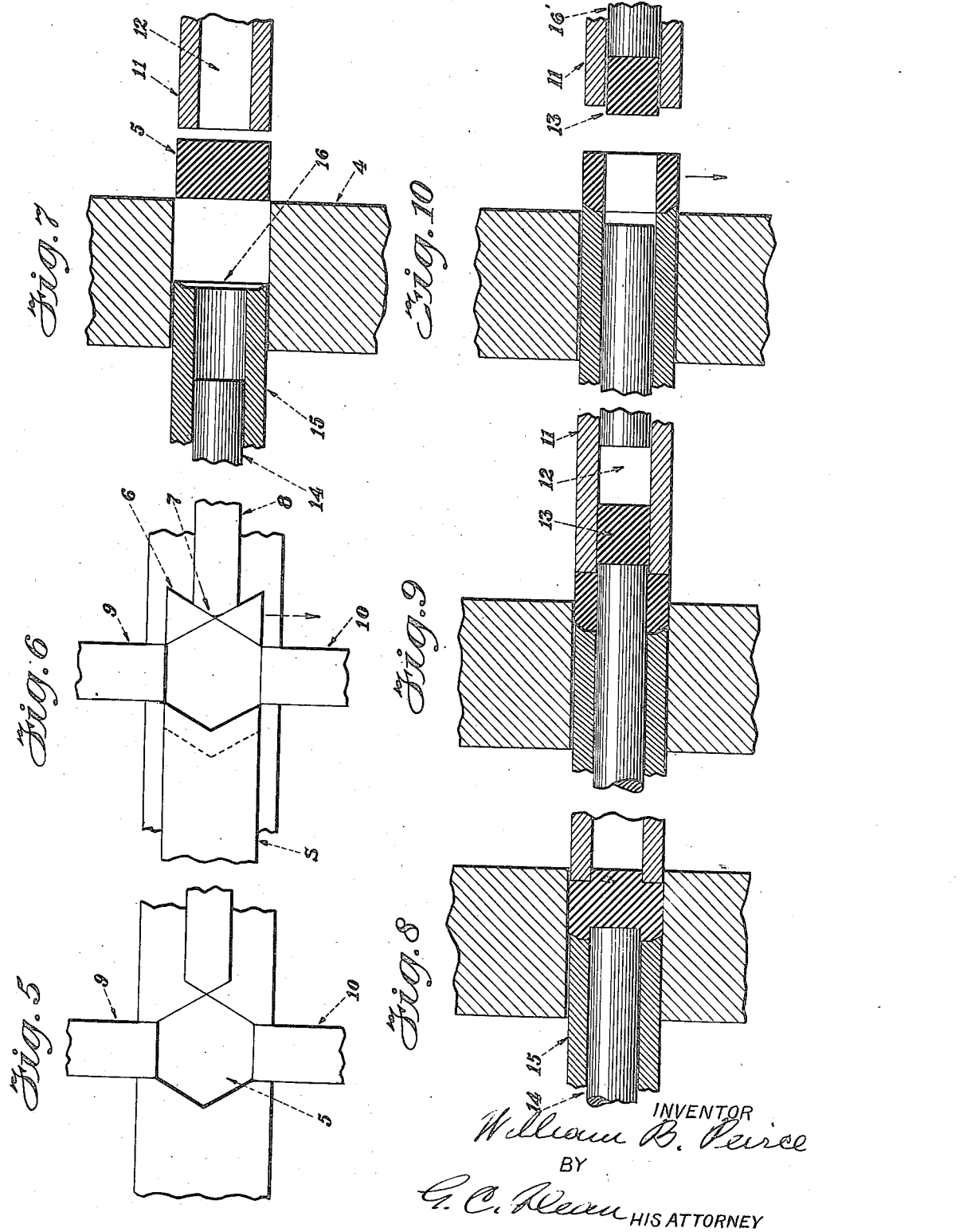

1,452,053

UNITED STATES PATENT OFFICE.

WILLIAM B. PEIRCE, OF NORTH TONAWANDA, NEW YORK.

SELF-FEEDING MACHINE AND METHOD.

Application filed April 24, 1920. Serial No. 376,259.

*To all whom it may concern:*

Be it known that I, WILLIAM B. PEIRCE, a citizen of the United States, and resident of North Tonawanda, in the county of Niagara and State of New York, have invented certain new and useful Improvements in Self-Feeding Machines and Methods, of which the following is a specification.

My present invention is concerned primarily with automatic mechanisms for punching perforated hexagonal nut blanks from a stock bar, although the invention is applicable to the making of nut blanks regardless of shape and can be used to advantage in automatic mechanisms broadly for punching metal or other stock into blanks of any desired size and shape.

Automatic machines of the type mentioned comprise stock feeding mechanism and stock working mechanism operatively disposed with respect to each other. By my invention I provide a novel feeding mechanism and a novel combination of such feeding mechanism with stock working mechanisms.

My feeding mechanism embodies one of various possible constructions for carrying out a novel method of stock feeding which method is also embraced in the inventions claimed herein.

An object of the invention is to provide a machine of the type set forth which shall form blanks of the desired size and shape expeditiously and accurately.

Another object is to provide a novel method of feeding stock to the metal working mechanism, which method shall eliminate the possibility of interference by a severed blank with the feeding of the stock and the operation of the working tools.

Another object is to provide a feeding mechanism for a nut punching machine, which mechanism shall operate automatically and efficiently according to the above method and which shall require little attention while in action.

Another object is to provide in automatic machines of the type mentioned, means simple and rugged in construction for guiding the stock accurately into the paths of the working tools, as it is fed forwardly.

Other objects will be in part obvious and in part pointed out hereinafter.

The invention has especial utility when embodied in nut punching machines and particularly in machines for making hexagonal nuts by punching from the red hot end of heavy stock.

My invention in a desirable embodiment involves a method and apparatus which will assure the removal of a blank cut from the stock bar from out of the path of the free end of the remaining stock bar so that the advance of said bar preparatory to the shearing off of the next blank shall not be impeded thereby. As conducive to a clear understanding of the general problem for which my invention furnishes a satisfactory solution it may be noted that more particularly in hexagonal nut punching machines the shearing punch is ordinarily made to operate along a horizontal line, it being intended that after each shearing action is completed and the punch is withdrawn from the die the sheared off blank should freely move, preferably by dropping out of the path of the stock bar so that the feeding forward of the material for the next nut blank, and the subsequent shearing off of said blank may take place without hindrance. In the case of hexagonal nuts more particularly, it will be apparent that the nut will not readily drop away from the stock bar after being sheared off as one of the vertices of this nut will extend into the corresponding notch in the remaining end of the stock bar. Unless some means is provided to cause or permit the removal of the sheared off nut, it is obvious that in many cases this nut remaining in contact with the free end of the stock bar will prevent the proper advance thereof and thus impede, if not prevent the operation of the machine.

This difficulty has been so annoying that the expedient of feeding the stock bar manually instead of automatically has frequently been resorted to. In this mode of operation a workman would stand in front of the nut punching machine grasping the hot end of a stock bar emerging from the furnace with a pair of tongs, and after each operation of the shearing punch, the workman would withdraw the stock bar slightly thus allowing a free path for the nut blank to drop, whereupon he would again manually advance the stock bar to place its heated end in the path of the shearing punch. This operation being non-automatic is consequently slow, requiring a correspondingly slow operation of the punching machine, resulting in a relatively low output, while requiring the entire time and undivided attention of at least one workman. Moreover as the movement of the stock bar is entirely under manual control of the workman, misalignment with the punches will sometimes occur resulting in mis-shaped blanks.

By my invention I provide a method and mechanism for automatically releasing the nut blank from the end of the stock bar prior to feeding the latter forwardly into the path of the shearing punch, and this releasing action is by preference carried out by a retracting movement of the stock bar, the latter being securely held against undesired displacement throughout the action. The preferred embodiment of the invention shown in the drawings comprises in its essence an automatic machine for punching hexagonal nuts, including shearing mechanism and feed mechanism constructed and arranged to operate on the cycle of alternately retracting the free end of the stock bar, remaining after the nut blank is sheared off, thus allowing the sheared off nut to drop, and then feeding the stock bar forwardly to place the end thereof into the line of action of the shearing punch. The invention is also concerned as heretofore noted, with the novel feed mechanism per se.

Referring now to the accompanying drawings in which is shown one of various possible embodiments of the several features of my invention, Fig. 1 is a plan view of a nut punching machine with the novel feeding attachment, parts only of the nut punching machine itself being shown and the platform being removed from the carriage of the feeding attachment.

Fig. 2 is an end view of the feeding attachment.

Fig. 3 is a view in longitudinal section of the nut punching machine, the entire feed mechanism being shown and parts of the shearing mechanism being shown broken away.

Fig. 4 is a plan view of the feed mechanism taken from the bottom and on a larger scale.

Fig. 5 is a plan view of the shearing die.

Fig. 6 is a view similar to Fig. 5 with the stock bar in place and the nut blank sheared off.

Fig. 7 is a sectional view showing the stock bar in the path of the punches and ready to have the nut blank sheared off.

Fig. 8 is a view similar to Fig. 7 showing the end sheared off, crowned and partially perforated.

Fig. 9 is a view similar to Fig. 8 showing the nut completely perforated and Fig. 10 shows the last step in the operation in which the punches are separated relative to each other and the nut blank is free to drop.

Similar reference characters refer to similar parts throughout the different views of the drawings.

Referring now to Fig. 1 of the accompanying drawings I have shown fragmentary parts of a nut punching machine of old construction. The parts comprise the power shaft 1 carrying the flywheel 2, and there is also shown the die block 3 with which the shearing punch or punches cooperate for cutting the nut blank. Those portions of the machine intervening between the shaft 1 and block 3 and other parts are omitted as not essential to a complete understanding of the invention.

Referring to Figs. 5 to 10 of the drawings I have shown diagrammatically the general arrangement of the shearing, crowning and perforating punches of die block 3, and the successive steps of operation performed thereby. It will be understood that the salient portion of the showing in these figures taken by itself represents the prior art and a brief description thereof is however here included as it will contribute materially to a clear understanding of the purpose, construction and operation of the feeding mechanism.

Referring accordingly to Figs. 5 to 10 of the drawings the die block is shown at 4 in sections to form the hexagonal die opening 5.

The V-shaped notch 6 in the end of the stock bar S, resulting from the blanking off of a nut extends over a vertex 7 on the stock gauge 8, which latter not only limits the advance of the stock bar, but serves to accurately align the end of the stock bar into the path of the punches, all as will appear more fully below. The shearing punch is shown at 11 and has a cylindrical opening 12 for accommodating the slug 13 punched out of the nut blank by the perforating punch 14 which is slidably mounted within the crowning punch 15, the latter having its crowning concavity at its end as shown at 16. The stock bar having been placed in the position shown in Fig. 6 with its end accurately positioned by the stock gauge 8, the mechanism of the punching machine (not shown) will cause the shearing punch 12 to move to the left to shear off the end of the stock bar pressing the nut blank into the die as shown in Fig. 8, and against the end of crowning punch 15, thus completing the shearing and crowning operations. The perforating punch 14 is now moved toward the right commencing the perforating function as shown in Fig. 8, after which the parts are brought into the relation shown in Fig. 9 in which the perforating operation has been completed and the slug 13 has been pushed by the perforating punch 14 into the cylindrical opening 12 within the shearing punch 11. The shearing, crowning and perforating operations are now entirely completed, and the crowning and shearing punches are moved to the position shown in Fig. 10 in which the nut blank should be free to drop from the punch. The slug 13 will be ejected from the hollow shearing punch by the operation of a plunger 16' thereon.

My feeding mechanism has a pair of standards 17 and 18 preferably secured to the floor of the frame adjacent the main portion of the punching machine. Upon the standard 18 is mounted the main portion of the attachment as shown in Fig. 3 and the standard 17 provides a support for the transmission means which delivers power from the main drive or power shaft 1 of the punching machine to the feeding mechanism. This power transmission by preference comprises a drive spindle 19 bolted as at 20 direct to the flywheel 2 and having a bearing 21 within the standard 17, a pair of miter gears 22 serving to transmit the rotation of the driving spindle to the transmission shaft 23 which is mounted at right angles to the power shaft 1 and has a bearing 24 in the standard 17 for one end and a similar bearing 25 in the standard 18 for the other end. A clutch 26 which may be controlled by a manually operated lever (not shown) serves to connect or disconnect the feed mechanism with respect to the power shaft 1.

Referring more particularly to Fig. 3 there is mounted rigidly upon the standard 18 a cylindrical guide support 27 for the reciprocating slide or carriage 28 to be described more fully below. The guide support by preference comprises a pair of aligned cylindrical projections 29' and 30' extending at right angles to the power shaft 23, the extension 29 directed forwardly from the transmission shaft 23 being longer than the rearwardly directed extension 30. It will be understood that the term "forward" has reference to the direction of feed of the stock to the punches.

Upon the transmission shaft 23 are keyed or otherwise rigidly supported a pair of cams 29 and 30 one on each side of the cylindrical supporting guide 27. These cams are preferably so arranged that they will effect in a positive manner, the movement of the carriage alternately forwardly and rearwardly along the guide support. For this purpose the carriage is preferably constructed of an advance portion 35 sleeved upon the forwardly extending part of the guide support and a rear portion 36 similarly sleeved upon the rearwardly extending part of the guide support. The carriage portions 35 and 36 are preferably secured together by four bolts 37, 38, 39 and 40, the former pair being at the upper part of the carriage and the latter pair at the lower part, said lower pair of rods extending through corresponding passages 38 in the guide support to prevent rotation of the carriage thereabout.

By preference an axle 39 is provided extending transversely of the advanced part of the carriage or slide and supporting a pair of advance cam rollers 40 adapted to be contacted by the cams 29 and 30. Similarly upon the rear portion of the slide I provide a pair of rear cam rollers 41 mounted upon spindles 42 integral with said slide portion. The cams preferably have a substantial arc constituting a bulge concentric with the axis of rotation to effect a period of dwell. It will be apparent that as the transmission shaft 23 is rotated, the cam alternately pushes against the advanced cam rollers 40 for advancing the carriage to the extreme position and then after a period of dwell the purpose of which will be more fully described below, the bulge of the cam will come into contact with the rear rollers 41 upon slide portion 36, to cause a positive retracting movement of the slide carriage.

The slidable carriage includes a platform 43 mounted thereon for carrying the stock bar S. By preference this platform includes a hardened steel facing plate 44 having integral guide flanges 45 for the side or wider surfaces of the stock bar.

In the retracting stroke of the carriage, as will appear more fully below, the stock bar recedes therewith and thus clears the nut blank which has been sheared off to allow it to drop, after it has been punched, crowned and ejected.

Means is provided for advancing the stock bar relative to the carriage so that when the carriage after its retracting movement has been returned to its extreme position of advance, the end of the stock bar will be properly positioned within the line of action of the punches so that the next nut blank can be severed. For this purpose I preferably provide a pair of identical feed rolls 46 and 47 mounted preferably upon the advanced portion of the carriage and adapted to grip preferably the sides or wider faces of the stock bar S between them in the manner best indicated in Fig. 1. These feed rolls are mounted upon the carriage to reciprocate therewith and are caused to rotate intermittently for advancing the stock bar with respect to the carriage at proper intervals, all by a construction which will now be described. The axles 49 of the feed rolls extend transversely through lugs 50 in the advanced part of the carriage and have at their lower ends below the carriage respectively a pair of identical gears 46' and 47', said gears preferably being of a diameter smaller than the distance between the axles so that they do not mesh but are spaced from each other as indicated at 53, in Fig. 4.

A pair of identical driving gears 54 and 55 are provided, one meshing with each of the gears 46' and 47', said driving gears meshing with each other as shown at 56. By this arrangement of gears it will be seen that when the driving gear 54 is urged in the direction of the arrow thereon shown in Fig. 4 it will directly impart a rotation to gear 46' and will cause gear 47' to rotate through the agency of intermediate gear 55 at the same rate as gear 46' but in opposite direction. The rotation of each gear thus takes place in the direction of the corresponding arrow for causing advance of the stock bar by the feed rolls in the direction of the larger arrow shown near the top of Fig. 4.

For imparting intermittent rotation to the driving gears to cause the intermittent advance of the stock bar relative to the carriage, I preferably provide a ratchet mechanism so constructed and arranged as to be actuated by virtue of the reciprocation of the carriage. This ratchet mechanism by preference comprises a ratchet wheel 57 rigidly mounted upon the same axle as driving gear 54 and cooperating with a pawl 58 pivoted as at 59 upon a pawl shroud 60, the latter in turn pivotally mounted about the common axis of gear 54 and ratchet wheel 57. A coil spring 61 is connected at one end to the pawl 58 and at the other to the shroud 60 so as to urge the tooth of pawl 58 against the toothed periphery of ratchet wheel 57. A pawl rod 62 is pivotally clamped at one end by a bolt 65 which extends through an elongated slot 64 in the pawl shroud, the other end of the rod passing through an eye 63 formed on a bracket 66 rigid or integral with the frame or standard of the feeding attachment, there being preferably a pair of stops 67 and 68 adjustably bolted upon the pawl rod 62, one to each side of the eye 65.

In the specific embodiment shown it will be apparent, having particular reference to Fig. 4, that as the transmission shaft 23 is rotated to move the carriage rearwardly or toward the bottom of the sheet, the gears and the ratchet wheel and also the pawl 57 will recede as a unit with the carriage until the stop 68 contacts the eye 65. During the continued retraction, the rod 62 must, therefore, remain stationary and will as a consequence compel the shroud 60 to rotate about its pivot, moving with it the pawl 58 to rotate the ratchet wheel for causing feed of the feed rolls in the manner already briefly indicated. Thus, I have provided a lost motion connection for delaying the feeding operation of the feed rolls until after the carriage has receded to a predetermined extent.

By preference a second pawl 69 is mounted upon the carriage to prevent rotation of the ratchet wheel in a direction reverse to that for causing feed.

The specific arrangement of driving gears 54 and 55 for transmitting the rotary impulse to gears 46' and 47' which latter are on the feed roll axles has the advantage of permitting separation of the feed rolls slightly with respect to each other for releasing the stock bar whenever desired, and this without demeshing any of the gears so that the stock bar can again be firmly gripped without the difficulty of binding or jamming gear teeth. This end is accomplished by mounting one of the feed rolls 47 together with its axle and the associated gear 47' to permit limited movement about the axis of gear 55. Specifically the axle of gear 47 is rotatably mounted on an arm 70, the end of which has an eye 71 encircling the shaft of gear 55. An operating handle 72 is provided, having cam teeth 73 cooperating with corresponding cam teeth 74 on a fixture 75 rigid with the side of the carriage adjacent feed roll 46. A rod 76 extends longitudinally through the fixture 75 and is secured at one end to the axle 49 of the feed roll 47, in a manner not shown. A spring 77 encircles the free end of rod 76 and is held in position by a nut 52 by which the compression of said spring may be adjusted. The drawings show the feed rolls in released position. When it is desired to clamp the stock bar between the said feed rolls the handle 72 is manually rotated through a small angle, whereupon the inclined surface of cam teeth 73 will ride up along the corresponding surface of the fixture 75 until the ends of the cams are in contact with each other, this action taking place against the compression of spring 77. The axle 49 is thereby shifted together with the feed roll 47 and the associated gear 47' slightly about the pivot 71 thus causing the feed rolls to tightly grip the stock bar. In this adjusting movement it will be seen that the gears 46', 47', 54 and 55 remain in mesh with each other, as the only gear which is shifted, that is gear 46' is rotated in an epicyclic movement about the gear 54. If the ratchet wheel 57 were directly connected coaxial with one of gears 46' and 47', gears 54 and 55 being dispensed with, and if gears 46' and 47' be directly meshed with each other, it is quite apparent that a release of the stock bar by moving one of the feed rolls would demesh the gears, with the consequent trouble and delay in effecting mesh. By my construction this difficulty is entirely avoided.

Between feed rolls 46—47 and the shearing mechanism, I preferably provide means for properly guiding the end of the stock bar so it may readily come into proper engagement with stock gauge 8. For this purpose I prefer to employ the gripper jaw unit best shown in Fig. 3. In its preferred embodiment this unit comprises a lower jaw 80 pivoted to the forward end of the platform 43 as at 81 and having a pair of upstanding ears 82 which support a pintle 83 at an elevation sufficiently above the top of jaw 80 to permit passage of the stock bar S therebetween. Pintle 83 serves as a hinge for the upper jaw member 84. Means is provided for urging the jaws into closing position with a constant and substantial force, which by preference comprises a lever arm 85 having a fulcrum 86 mounted directly upon the upper jaw 84, the rear end of said lever being urged upwardly by a pair of strong coil springs 86' which encircle rods 87 secured to the lower jaw 80, the free or power end 88 of the lever 85 pressing downwardly upon the upper jaw 84 with a substantially constant force to cause the gripping end 89 of the upper jaw to exert a constant clamping force upon the upper and lower narrower sides of the stock bar at a point adjacent to the punches about to shear off the nut blank. The gripper jaw unit is supported near its forward end from the die block 3 by means of a support rod 90 pivoted to the lower jaw 80 as at 91 and extending upwardly and transversely through a rock shaft 92 in the frame of the machine. A strong coil spring 93 encircles rod 90 and is disposed between the rock shaft 92 and the adjustable nut 94. The lower jaw is preferably covered by a hardened steel facing plate 95.

The feed rolls 46, 47 thus grip the faces or wide surface of the stock bar, whereas the advanced gripper jaw unit grips the sides or narrow surfaces of the stock bar, at right angles to the faces. By this arrangement the stock bar is restrained against material deflection either in a vertical or in a horizontal plane. Moreover, the advanced gripper unit will effectively hold pieces of stock too short to reach the feed rolls.

The platform 43 of the reciprocating carriage together with the advanced gripper jaw unit which is pivoted thereto at 81 may be associated with the reciprocating slide or carriage portion 28, 29 in any desired manner. I have shown a convenient construction which renders possible ready assembly of the machine. For this purpose the slide or carriage portion has an upstanding ridge or shoulder 98 extending into a corresponding slot or groove 99 in the bottom of the platform. The ends of the shoulder and groove are preferably perpendicular to the line of reciprocation so that the slide will positively carry the platform with it at all times. It will be seen, however, that when it is desired to remove the platform from the slide it is merely necessary to lift its free or rear end slightly to clear the projection 98 on the slide when the platform together with the advanced gripper jaw unit can be withdrawn as a whole. It will be noted from the drawings and the above description that my slidable carriage has mounted therein and carries therewith, the feed rolls 46, 47, the gears 54, 55, 46' and 47' for operating the same, the ratchet mechansm 57, 58 for actuating said gearing, the manual means for releasing and gripping the stock bar, and the advance gripper jaw unit.

The machine is set for operation substantially as follows: A length of stock bar being passed out of the furnace and between the feed rolls 46, 47, the latter in the released position shown in Fig. 1, the crank 72 is turned through a small angle by hand to cause the cam teeth to assume end to end position against the resistance of spring 77. By this means the gripping action upon the feed rolls is readily accomplished in a manner heretofore fully described, and as already shown no delay can occur by failure of gear teeth to enter readily into mesh. Power can now be applied to the machine and the main power shaft 1 will operate the metal working portion of the machine. This mechanism, being well known, its operation is well understood and need not be described. Through the miter gears 22 the power shaft 1 operates the transmission shaft 23 which actuates my feeding attachment when clutch 26 is thrown.

Assuming that a nut blank has just been severed from the end of the stock bar by the punching machine and that the feeding attachment is in the position shown in Fig. 3 the action proceeds as follows: Cams 29 and 30 in their rotation by the transmission shaft 23 (having particular reference to Fig. 4) will be brought into contact with rear rollers 41 to cause the slide or carriage to move backwardly along the cylindrical guide support carrying with it the platform 43, the gripping rolls 46—47, and the advance gripper jaw unit together with the entire length of stock bar. By this movement of retraction the severed hexagonal nut blank as shown in full lines in Fig. 3 will be entirely freed from contact with the feeding attachment so that it can drop unimpeded. Referring more particularly to Fig. 4, as the movement of withdrawal of the carriage proceeds carrying with it the feed rolls, the gears 46', 47', 54 and 55 together with the ratchet wheel 57 and its associated pawl 58, the stop 68 on the pawl rod 62 will be arrested by the eye 65 on the frame of the attachment and as the carriage continues the movement of retraction the pawl shroud 60 will be rotated about its pivot thereby causing the pawl 58 which is now held against movement of retraction with the carriage, to rotate the ratchet wheel 60 through an angle depending upon the position of the stop 68 on the pawl rod relative to the stop eye 65. The rotation of the ratchet wheel is imparted through the gear 54 which rotates with it as a unit to the gear 55, said gears 54 and 55 respectively rotating gears 46′ and 47′. The arrows clearly show the direction of rotation of each gear. Since the gears 46′ and 47′ are rigid one with each of the feed rolls 46, 47 the latter will rotate in the direction of the arrows to feed the stock bar forwardly relative to the carriage. The adjustable stop 68 is so set that the amount of feed is equal to the width of the nut blank sheared off so that the stock bar again assumes the proper position relative to the supporting platform to place the free end of said stock bar in the path of the punches when the carriage is again advanced to its limit.

As the operation proceeds the bulge of the cams will come into contact with the advance rollers 40 which will then cause the carriage to move forwardly. In the forward movement of the carriage, after stop 67 reaches the eye 65, the pawl 58 will be arrested against advance therewith and the continued advance of the carriage will permit this pawl to click over the teeth of the ratchet wheel 57 without causing rotation thereof. The pawl 69 locks said gear and with it the other gears against any possibility of reverse rotation. As the carriage advances, the free end of the stock bar which is notched in form as a result of the removal of the previously formed nut blank will register with the vertex 7 on the stock gauge 8 so that the free end of the stock bar will now be accurately positioned in the line of action of the punches shown in Figs. 5 to 10 of the drawings.

The advance gripper jaw unit being pivoted to the forward end of the platform 43 and being pivotally and yieldingly supported near its forward end from the die block frame this unit may adapt itself to any slight irregularity in the form of the stock bar tending to move the jaws slightly about pivot 81 either upwardly or downwardly. As the notched end of the stock bar is urged by the advancing carriage against the vertex of the stock gauge the contacting inclined surfaces of bar and gauge tend to cause a compensating displacement of the stock bar, to accurately position the vertex of the notch against the vertex of the stock gauge, thus accurately positioning the stock bar for shearing off the blank for the next nut. Thus a portion of the heavy metal working machine as distinguished from the feeding attachment acts to force the stock bar into proper position, should the same have any slight deflection. The punching action as best shown in Fig. 6 will form the nut blank cutting off two waste triangular portions $w'$ and $w^2$, the lower of which $w^2$, can drop at once, and as the carriage is withdrawn together with the stock bar the nut blank and the remaining triangular waste piece $w'$ and the slug 13 will be free to drop away from the cooperating mechanism. A complete cycle of operation has now been described.

The cams 29 and 30 as above pointed out have a substantial portion of their peripheries concentric with their shafts effecting the dwell needed to allow the punching operations to proceed with the carriage stationary.

As a stock bar is merely used up and its rear end reaches the feed rolls, a new stock bar is fed from the furnace between the feed rolls and pushes the stub end of the previous bar forwardly through the gripper jaws to the punches permitting this stub to be completely used up. The gripper jaws in cooperation with the stock gauge 8 constitute adequate means for aligning such short ends in the path of the punches.

If at any time, and for any reason, access is desired to the stock bar, the handle 72 can be given a lateral blow to turn it, thus allowing spring 77 to snap the cam surface into the relative position shown in Fig. 2. The stock bar is now released and the feeding attachment itself may be arrested by throwing clutch 26 to idle position.

Although I prefer to time the punching and the feeding mechanism relative to each other such that the withdrawing action of the feed mechanism takes place after the shearing and the perforating punches have performed their function and have retracted to the position shown in Fig. 10 it will be apparent that this withdrawing action can be made to commence at any time after the nut blank has been sheared off from the end of the stock bar. In other words, the withdrawing action of the carriage may be made to commence as early in the cycle of the punching operation as that shown in Fig. 8 where the nut blank has just been sheared off from the stock bar or at any stage in the punching operation subsequent thereto or even subsequent to the stage shown in Fig. 10. The withdrawing action briefly stated may be made to commence at any instant subsequent to the complete severing of the nut blank from the end of the stock bar.

In its essence the operation proceeds briefly as follows: The carriage with the stock bar firmly gripped thereon moves forwardly to place the end of the stock bar in the path of the shearing, crowning and perforating punches. After the nut has been completely sheared off the carriage is retracted together with the stock bar thereon, thus allowing the nut blank and any waste pieces to freely move or drop out of the path of the stock bar before the same is again advanced. Preferably during the retraction stroke of the carriage the feed rolls are rotated to advance the stock bar relative to the carriage by a length equal to the diameter of the hexagonal nut blank, and the carriage is moved forwardly again to place the end of the stock bar in the path of the punches.

In the specific construction disclosed, the advance of the stock bar relative to the carriage takes place during the retracting stroke of the carriage and after this retracting stroke has commenced and preferably after it has proceeded by an amount in excess of the diameter of the nut. It is, of course, obvious that my invention may be embodied in a construction in which the advance of the stock bar relative to the carriage proceeds partly during the retracting stroke and partly during the advance stroke of the carriage or the entire forward feed of the stock bar relative to the carriage may be arranged to take place during the advance stroke rather than during the retracting stroke of the carriage. This feature of my invention may be carried out in any construction in which the carriage recedes after the nut blank is sheared off and in which the stock bar while continually gripped against displacement, is fed forwardly upon the carriage at any period in the cycle of operation and at any rate desired with the only limitation that the absolute movement of the end of the stock bar at the beginning of its retracting stroke must be rearwardly or away from the severed nut blank so that the latter can drop out of the way.

With regard to the advance of the end of the stock bar into the line of action of the punches, the only limitation as to the time this may occur is that the shearing, crowning and perforating punches and the sheared off nut blank and any waste pieces must have moved out of the path of the free end of the stock bar before it is advanced over the die.

Obviously these various timing features will be set by establishing a proper relative angular position of the power shaft 1 and transmission shaft 23 which angular position may be adjusted by separating miter gears 22, advancing or retarding one with respect to the other to the appropriate extent and remeshing them and by adjusting the position of the stop 68 on the pawl rod.

Some of the advantageous results of my invention can, of course, be achieved by retracting the stock bar relative to the carriage after the nut blank has been sheared off the stock bar, without retracting the carriage itself. In the case of the specific form of gripper jaw used in my preferred construction where the stock bar is gripped above and below, immediately adjacent the end sheared off as a nut blank, it is apparent that if the stock bar were retracted relative to the gripper jaw without retracting the carriage or the gripper jaw, the nut blank although much less impeded might still be hindered somewhat against free drop as one of its vertices would extend between the separated ends of the jaws. I therefore prefer to retract the carriage with the stock bar carried thereon particularly in the case of hexagonal nut punching machines, although it is to be understood that my invention in its broader aspects embraces such construction in which the carriage is not reciprocated. If a type of mechanism were employed where the stock bar is not gripped immediately adjacent the projecting end to be sheared off, or in the case of square nuts for instance, where there is no projecting vertex, my invention could obviously be carried out in an embodiment in which the stock bar is fed rearwardly to allow the sheared off blank to drop and then advanced to place the free end of the stock bar along the line of the punches all without reciprocating the stock bar support.

Thus broadly the only limitation relative to the movement of the stock bar is that the same must have an absolute retracting movement at such time as to permit the severed nut blank to drop, and that the return of the stock bar to advance position must not occur until the punches are retracted and the severed pieces of metal have dropped away.

From all of the above considerations it will be clear that I have invented a method of feeding stock bars for a nut punching or similar machine, which method can be carried out by a broad variety of constructions. The modus operandi consists simply in feeding a stock bar forwardly into the line of action of the punches retracting the stock bar after the nut or other blank has been sheared off and advancing the stock bar again by an amount to compensate for the original retraction and for the length of bar needed for the next nut blank to be sheared off, all these steps being performed while the stock bar is continually gripped along the line of its length and in alignment with the shearing punch, thus guarding against shifting if the stock bar be released in operation with the consequent likelihood of producing mis-shaped nuts.

The broad method can be carried out by a construction in which the feed rolls are operated at proper intervals direct from the power shaft of the nut punching machine instead of through the reciprocation of the carriage. In such possible construction the rotation of the feed rolls would obviously be independent of the amount of travel of the carriage.

With regard to the specific construction of the mechanism for intermittently rotating the feed rolls I prefer to employ the lost motion connection shown and described for delaying the advancing action of the feed rolls until after the carriage has been retracted a material amount. Any means may, however, be employed to retract the stock bar at an appropriate time to allow the nut blank to drop. The specific pawl and ratchet mechanism for actuating the feed rolls constitutes only one of numerous possible mechanical movements for bringing about this result, and this movement is itself of broader application to mechanisms for different uses.

With regard to the supporting means for the stock bar comprising the advanced gripper jaws, this combination constitutes a desirable construction for conveniently aligning the stock bar with the punches and although this feature has its preferred application in connection with a construction of the type and for the purpose of that shown and described it will be apparent that this supporting means can be used and performs many of its desirable functions in a construction in which the carriage is not reciprocated but the stock bar is merely intermittently advanced thereon for feed purposes.

My manual mechanism for releasing the pressure from the stock bar whenever desired without demeshing the gears through which the same is operated, or any of such gears is, of course, of broader application to a wide variety of possible constructions. Obviously this device can be embodied as an element in a machine in which release of the stock bar is made to take place intermittently and automatically instead of manually, for any desired purpose.

While the automatic feed withdraw and feed operation of my mechanism is particularly advantageous in all cases where the cutting off mechanism leaves a re-entrant angle on the stock, there are many other situations in this and other arts where the same automatic withdrawal and feed of the stock is desirable. For instance, where square dies and punches are substituted in the punch mechanism shown in the drawings for the purpose of punching a square nut, leaving a vertical surface on the end of the stock bar, I have found that this special operation of the feed mechanism is desirable because, in practice, the punching of a bar of the required thickness necessarily leaves the vertical surface ragged, so that if the bar is not withdrawn slightly at the proper instant, the fibers of the metal projecting from the vertical surface may catch the punching released from the machine, sufficient to prevent its falling freely and promptly out of the way.

I claim:—

1. In a feed mechanism for feeding a stock bar to a machine adapted to cut a blank of uniform size from the end of said stock bar, the combination of a carriage mounting the stock bar, means for moving said carriage with the stock bar out of the path of the blank cut therefrom, means to then feed the carriage back to the original position and means to feed the stock bar forwardly upon the carriage into position for formation of the next blank.

2. In a feed mechanism for feeding a stock bar to a machine adapted to cut a blank of uniform size from the end of said stock bar, the combination of a carriage mounting the stock bar, means for moving said carriage with the stock bar backwardly out of the path of the blank cut therefrom, means for then advancing the carriage to its original position, and means for feeding the stock bar forwardly upon said carriage for formation of the next blank.

3. In a feed mechanism for nut punching machines and the like, in combination, a support, means for gripping a stock bar to dispose the same in fixed position relative to the support, means to move said stock bar while gripped with respect to said support out of the way of a nut blank that has been formed in order to let said nut blank drop, and means for then feeding said stock bar for formation of the next nut blank while gripped with respect to said carriage.

4. In a feed mechanism for nut punching machines and the like, in combination, a support, means for gripping a stock bar to dispose the same in fixed position relative to the support, means to move said stock bar while gripped with respect to said support longitudinally backwardly to clear the severed nut blank in order to allow the same to drop, and means to then advance said stock bar while still gripped with respect to said support in order to dispose the same in position relative to the punching dies to allow the next blank to be punched.

5. In a nut punching machine of the type in which a shearing punch severs nut blanks successively from the end of a stock bar and said blanks are permitted to drop by gravity as they are formed, means for limiting the stock bar to displacement along the line of feed, means for automatically feeding said bar into the path of the shearing punch, and means for retracting the bar after the blank is punched in order to permit said blank to drop.

6. In a nut punching machine of the type in which a shearing punch severs nut blanks successively from the end of a stock bar and said blanks are permitted to drop by gravity as they are formed, an automatic feeding attachment operatively connected to be driven from the power shaft of said punching machine, said attachment including means for limiting the stock bar to displacement along the line of feed, and means for retracting the bar after the blank is punched in order to permit said blank to drop.

7. In a feed mechanism for nut punching machines and the like, in combination, a carriage for mounting the stock bar, means to reciprocate said carriage, and means to feed the stock bar forwardly upon said carriage during the reciprocating movement thereof, the absolute movement of said stock bar being rearward at the beginning of the rearward stroke of the carriage.

8. In a feed mechanism for nut punching machines and the like, in combination, a carriage for mounting the stock bar, means to reciprocate said carriage, and means to feed the stock bar forwardly upon said carriage during the reciprocating movement thereof, said stock bar feeding means being set into operation after said carriage reciprocating means commences its rearward stroke.

9. In a feed mechanism for nut punching machines and the like, the combination of a reciprocating carriage for mounting a stock bar, and means to cause advance of said stock bar upon said carriage when the same has receded on its backward stroke by an amount in excess of the width of a nut blank.

10. In a feed mechanism for nut punching machines and the like, the combination of a carriage, means for reciprocating said carriage, means to feed the stock bar relative to the carriage during the reciprocating movement thereof, a driving member for operating both said means, and a lost motion connection between said driving member and said stock bar feeding means to cause the latter to start its advance after said carriage has started withdrawal.

11. In a feed mechanism for nut punching machines and the like, the combination of a carriage, means for reciprocating said carriage, means to feed the stock bar relative to the carriage during the reciprocating movement thereof, a driving member for operating both said means, and a lost motion connection between said driving member and said stock bar feeding means for starting advance of said stock bar after the carriage has withdrawn by an amount in excess of the width of a nut blank.

12. In a feed mechanism for nut punching machines and the like, in combination, a carriage, means to reciprocate said carriage by imparting thereto alternate forward and backward strokes, and means to feed the stock bar forwardly upon the carriage by the width of one nut during one of the strokes of each reciprocation, the absolute movement of the stock bar being rearward at the beginning of the rearward stroke of the carriage.

13. In a feed mechanism for nut punching machines and the like, in combination, a carriage, means to reciprocate said carriage by imparting thereto alternate forward and backward strokes, and means to feed the stock bar forwardly upon the carriage by the width of one nut during the retracting movement of the carriage and after said movement has commenced.

14. In a feed mechanism for nut punching machines and the like, the combination of a carriage, means for reciprocating said carriage, means to feed the stock bar relative to the carriage during the reciprocating movement thereof, a driving member for operating both said means, and a lost motion connection between said driving member and said stock bar feeding means to cause the latter to start its advance after said carriage has started withdrawal and during said movement of withdrawal.

15. In a feed mechanism for nut punching machines, and the like, in combination, a carriage, feed rolls carried thereon for clamping a stock bar, means to reciprocate the carriage with the feed rolls, and means to rotate said feed rolls during the reciprocating movement thereof for advance of said stock bar, the absolute movement of the stock bar being rearward at the beginning of the rearward stroke of the carriage.

16. In a feed mechanism for nut punching machines and the like, in combination, a carriage, feed rolls carried thereon for gripping a stock bar, means to reciprocate the carriage together with the feed rolls, means to rotate said feed rolls to cause advance of the stock bar, a driving member for operating both said means, and a lost motion connection between said driving member and said feed rolls to cause the latter to start rotation after said carriage has started withdrawal.

17. In a feed mechanism for nut punching machines and the like, in combination, a carriage, feed rolls carried thereon for gripping a stock bar, means to reciprocate the carriage together with the feed rolls, means to rotate said feed rolls to cause advance of the stock bar by the width of one nut, a driving member for operating both said means, and a lost motion connection between said driving member and said feed rolls to cause the latter to start rotation after said carriage has started withdrawal and during the withdrawal stroke.

18. The combination of a carriage adapted to reciprocate and feed a blank endwise, feed rolls on the carriage for gripping the blank continuously, and means for intermittently rotating said feed rolls to move said blank with respect to said carriage.

19. In a feed mechanism for nut punching machines and the like, the combination of a frame, a carriage thereon, feed rolls mounted on said carriage, means reciprocating said carriage, and a mechanical movement for rotating said feed rolls during the reciprocation of said carriage, said mechanical movement having one part upon said carriage and a cooperating part upon said frame for actuation by virtue of the reciprocation of said carriage.

20. In a feed mechanism for nut punching machines and the like, the combination of a frame, a carriage thereon, feed rolls mounted on said carriage, means reciprocating said carriage, mechanism for rotating said feed rolls including cooperating pawl and ratchet members, one of said cooperating members being mounted on said carriage and the other arrested by said frame.

21. In a feed mechanism for nut punching machines and the like, the combination of a frame, a carriage thereon, feed rolls mounted on said carriage, means reciprocating said carriage, means for rotating said feed rolls, said means including a ratchet upon said carriage, a cooperating pawl and a member connecting said pawl to said frame to limit the advance of said pawl with said carriage.

22. In a feed mechanism for nut punching machines and the like, in combination, a frame, a reciprocating carriage thereon, a pair of feed rolls on said carriage having their axles extending through the carriage, a ratchet wheel upon the carriage and connected for rotating said axles, a pawl cooperating with said ratchet wheel, and a member connecting said pawl to said frame to cause said pawl to rotate said ratchet during the reciprocation of said carriage.

23. In a feed mechanism for nut punching machines and the like, in combination, a frame, a reciprocating carriage having a pair of opposite faces, a pair of feed rolls mounted upon one said face, an axle for said rolls extending transversely of said carriage and having gears adjacent the opposite face thereof, a ratchet wheel mounted upon said carriage adjacent one of said gears, a pawl cooperating with said ratchet wheel, a member connecting said pawl to said frame to cause said pawl to rotate said ratchet during the reciprocation of said carriage, and means connecting said ratchet wheel to said gears to rotate the same at equal speed in opposite directions.

24. In a feed mechanism for nut punching machines and the like, in combination, a frame, a reciprocating carriage having a pair of feed rolls upon its upper face, axles for said rolls extending transversely of said carriage and having gears at their lower ends of substantially the same diameter as said rolls, a pair of driving gears upon said carriage meshing with each other and one with each of said first gears, a ratchet wheel coaxial and rotatable with one of said driving gears, a pawl cooperating with said ratchet wheel, and a member connecting said pawl to said frame to cause said pawl to rotate said ratchet during the reciprocation of said carriage.

25. In a feed mechanism for nut punching machines and the like, the combination of a frame, a carriage thereon, feed rolls mounted on said carriage, means reciprocating said carriage, and a mechanical movement for rotating said feed rolls during the reciprocation of said carriage, said mechanical movement having one part upon said carriage and a cooperating part upon said frame for actuation by virtue of the reciprocation of said carriage and a lost motion connection in said mechanical movement to delay rotation of said feed rolls until after the reciprocation of said carriage has commenced.

26. In a feed mechanism for nut punching machines and the like, the combination of a frame, a carriage thereon, feed rolls mounted on said carriage, means reciprocating said carriage, and mechanism for rotating said feed rolls, including cooperating pawl and ratchet members, one of said cooperating members being mounted on said carriage and the other having a lost motion connection with said frame to be arrested thereby for causing operation of said feed rolls after the reciprocation has commenced.

27. In a feed mechanism for nut punching machines and the like, the combination of a frame, a reciprocating carriage, feed rolls thereon, means for rotating said feed rolls including a ratchet on the carriage, a pawl cooperating therewith, a pawl rod connected thereto and having a stop rigid therewith, a part of said frame being in the path of said stop.

28. The combination of claim 27 in which the stop is adjustably mounted in position upon the pawl rod.

29. In a feed mechanism for nut punching machines and the like, in combination, a frame, a reciprocating carriage thereon, feed rolls on said carriage, means for rotating said feed rolls comprising a ratchet on said carriage, a pawl shroud pivoted coaxially of said ratchet, a pawl pivoted therein, a spring urging said pawl into engagement with said ratchet, and a pawl rod adjustably secured at one end to said shroud and having stops rigid therewith and on opposite sides of a part of said frame.

30. In a feed mechanism for nut punching machines and the like, the combination of a frame, a carriage thereon, feed rolls mounted upon the latter, means to reciprocate the carriage with the feed rolls, a pawl and ratchet mechanism for rotating said rolls for feeding the stock bar forwardly during the reciprocating stroke of said carriage, said mechanism having one of its cooperating parts mounted on said carriage and the other joined to said frame by a lost motion connection, whereby said rolls will commence feeding after the retracting stroke of the carriage has started.

31. The combination of claim 30 in which a second pawl cooperates with the ratchet to prevent reverse rotation thereof.

32. In a feed mechanism for nut punching machines and the like, the combination of a frame, a carriage thereon, feed rolls mounted on the latter, means to reciprocate the carriage with the feed rolls, a ratchet mechanism for rotating said feed rolls, said mechanism comprising a ratchet wheel upon the carriage, a pawl cooperating with said ratchet wheel, and a member connecting said pawl to said frame by a lost motion connection to commence actuation of said ratchet after a reciprocating stroke of the carriage has commenced.

33. In apparatus of the character described, in combination, a frame, a reciprocating stock carriage, a supporting guide for said carriage rigid with said frame, power shaft upon said frame and an eccentric driven therefrom and coacting directly with parts of said carriage for reciprocating the same along said guide.

34. In apparatus of the character described, in combination, a frame, a reciprocating stock carriage, a supporting guide for said carriage rigid with said frame, a power shaft upon said frame, and a pair of cams upon said shaft and coacting with said carriage on opposite sides of said guide.

35. In apparatus of the character described, in combination, a frame, a power shaft therein, a reciprocating carriage upon said frame, a supporting guide integral with said frame and at right angles to said power shaft, said carriage extending along said guides and to both sides of said shaft, and a pair of cams on said shaft in phase with each other and coacting with said carriage at points on opposite sides laterally of said guides to positively shift said carriage back and forth.

36. In apparatus of the character described, in combination, a frame, a power shaft therein, a reciprocating carriage upon said frame, a supporting guide integral with said frame and at right angles to said power shaft and having a forwardly and a rearwardly extending portion with respect to the shaft, said carriage having two parts spaced from each other and rigidly secured together, said parts being slidable, one on the forwardly and one on the rearwardly extending guide portions, and a cam on said shaft to one side of said guide and adapted to reciprocate the carriage by contact alternately during rotation with the adjoining parts of the carriage to the front and to the rear thereof.

37. In apparatus of the character described, in combination, a frame, a power shaft therein, a reciprocating carriage, a cylindrical supporting guide integral with said frame and at right angles to said power shaft and having a forwardly and a rearwardly extending portion with respect to said shaft, said carriage having two parts spaced from each other, bolts securing said parts together, some of said bolts extending through portions of said cylindrical supporting guide, said carriage parts being slidable one on the forwardly and one on the rearwardly extending guide portions, a pair of cams on said power shaft and on opposite sides of said guides, adapted to reciprocate the carriage by contact alternately during rotation with the adjoining parts of the carriage to the front and to the rear thereof, and cam rollers on said carriage for said cams.

38. In a feed mechanism for nut punching machines and the like, in combination, a frame, a power shaft therein, a reciprocating carriage, supporting guides for said carriage integral with said frame, a cam on said shaft and coacting with said carriage to positively urge it alternately in opposite directions, feed rolls on said carriage, and means actuated by power from said shaft to intermittently rotate said feed rolls.

39. In a feed mechanism for nut punching machines and the like, in combination, a frame, a power shaft therein, a reciprocating carriage, supporting guides for said carriage integral with said frame, a cam on said shaft and coacting with said carriage to positively urge it alternately in opposite directions, feed rolls on said carriage, and means actuated by power from said shaft to rotate said feed rolls for advancing stock after the retracting stroke of the carriage has commenced.

40. In a feed mechanism for nut punching machines and the like, in combination, a frame, a power shaft therein, a reciprocating carriage, supporting guides for said carriage integral with said frame, a cam on said shaft and coacting with said carriage to positively urge it alternately in opposite directions, feed rolls on said carriage, and pawl and ratchet means actuated by power from said shaft to rotate said feed rolls for feeding stock during the retracting stroke of said carriage and after said stroke has commenced.

41. In a feed mechanism for nut punching machines and the like, the combination of a frame, a power shaft therein, a reciprocating carriage mounted upon said frame, feed rolls on one surface of said carriage, a pawl and ratchet mechanism to operate said feed rolls disposed adjacent the opposite surface of said carriage, and a pawl rod having a stop disposed with a part of said frame in the path thereof, whereby after said stop is arrested by said frame as the former is moved with said carriage in one direction, said pawl and ratchet mechanism will be actuated to rotate said feed rolls.

42. In a feed mechanism for nut punching machines and the like, in combination, a frame, a power shaft therein having two cams, a carriage mounted upon said frame and adapted to be reciprocated by said cams, feed rolls on the upper surface of said carriage, a pawl and ratchet mechanism on the lower surface thereof for actuating said feed rolls, and a pawl rod disposed with a part of said frame in the path thereof, whereby after said stop is arrested by said frame as said carriage is moved in one direction by said cam, said pawl and ratchet mechanism will be actuated to rotate said feed rolls.

43. A feed mechanism for nut punching machines and the like including a platform, a pair of grip rolls thereon for holding a stock bar, and a pair of jaws in advance of said rolls and gripping said stock bar immediately back of the portion about to be sheared off.

44. A nut punching machine including a feed mechanism and a shearing mechanism driven from a common source of power, said feed mechanism including a stock bar support, a pair of rotatable feed rolls gripping the stock bar against deflection in one plane, and a pair of jaws in advance of said rolls and extending into close proximity to the punching element of said shearing mechanism for gripping said stock bar against deflection in a plane at right angles to said first mentioned plane.

45. A nut punching machine including a shearing mechanism having a punch operating in a horizontal line, a feed mechanism, a common power shaft for both said mechanisms, said feed mechanism including a stock bar support, a pair of rotatable feed rolls gripping the stock bar against lateral deflection, and a pair of jaws in advance of said rolls and extending into close proximity to the punching elements of said shearing mechanism for gripping said stock bar against deflection in a vertical plane.

46. In combination, a feed mechanism including a platform, a pair of feed rolls thereon for gripping a stock bar, and an advanced gripping member for holding said stock bar adjacent the end about to be sheared off, said gripping member having a pivot, and resilient means for opposing deflection of said gripping member about its pivot in one direction.

47. A nut punching machine including a die block, a feed mechanism, said latter mechanism including a platform, a pair of feed rolls thereon holding a stock bar and an advanced gripping member pivoted to the forward end of said platform for gripping said stock bar at a point adjacent the end about to be sheared off, and means for supporting said advanced gripping member from said die block.

48. A nut punching machine including a die block, a feed mechanism, said latter mechanism including a platform, a pair of feed rolls thereon holding a stock bar and an advanced gripping member pivoted to the forward end of said platform for gripping said stock bar adjacent the end about to be sheared off, a rod for supporting said gripping member near its forward end, and a compression spring for cushioning said support.

49. A feed mechanism for nut punching machines and the like including a platform, a pair of feed rolls thereon for holding a stock bar and an advanced gripping member for gripping said bar adjacent the end about to be sheared off, said gripping member comprising a lower jaw, an upper jaw pivoted thereto, and a spring exerting a constant closing force upon said jaws.

50. A feed mechanism for nut punching machines and the like including a platform, a pair of feed rolls thereon for gripping a stock bar laterally, an advanced gripping member aligned with said platform and having a lower and an upper jaw for gripping said stock bar between them, and a spring for exerting a constant closing force upon said jaws.

51. A feed mechanism for nut punching machines and the like including a platform, a pair of feed rolls thereon for gripping the stock bar laterally, an advanced gripping member pivoted to the forward end of said platform and having a lower jaw and an upper jaw for gripping said stock bar between them, a spring for exerting a constant closing force upon said jaws, and means for supporting said advanced gripping member near its forward end.

52. A nut punching machine including a shearing and a feed mechanism driven from a common source of power, said feed mechanism including a platform for supporting a stock bar, a pair of feed rolls on said platform and an advanced gripper jaw unit pivoted to the forward end of the said platform, spring means for exerting a constant closing force upon said jaws, and a rod and cushion spring mounted in the frame of said shearing mechanism for yieldingly supporting said gripper jaw element near its forward end.

53. A nut punching machine including a shearing and a feed mechanism driven from a common source of power, said feed mechanism including a platform for supporting a stock bar, means for reciprocating said platform, a pair of feed rolls on said platform and an advanced gripper jaw unit pivoted to the forward end of said platform, spring means for exerting a constant closing force upon said jaws, a rod pivotally mounted in the frame of said shearing mechanism having a cushion spring associated therewith for yieldingly supporting said gripper jaw element near its forward end.

54. A nut punching machine including a shearing mechanism and a feed mechanism, said feed mechanism including a platform for supporting a stock bar, a pair of feed rolls on said platform gripping said stock bar laterally, means driven from the main power shaft for reciprocating said platform, an advanced gripper jaw unit pivoted to the forward end of said platform for gripping said stock bar at its top and bottom, spring means for exerting a constant closing force upon said jaws, a support rod fitted in the frame of said shearing mechanism and connected to said gripper jaw unit near its forward end, and a cushion spring associated with said rod for rendering said support yielding.

55. A feed mechanism for hexagonal nut punching machines or the like including a platform for supporting a stock bar, means for reciprocating said platform, a pair of feed rolls upon said platform, and an advanced gripping member to be retracted with said platform to allow the hexagonal punching to drop.

56. The combination of claim 55 in which the feed rolls grip the stock bar laterally and the advanced gripping member grips the upper and lower surfaces of the same.

57. A nut punching machine including a feed mechanism and a shearing mechanism driven from a common power shaft, said feed mechanism including a platform for supporting a stock bar, a pair of feed rolls on said platform, an advanced gripper jaw unit pivoted to the forward end of said platform, spring means for exerting a closing force upon said jaws, a rock shaft supported by the frame of said shearing mechanism, a rod extending through said rock shaft and supporting the advanced end of said gripper jaw unit, and a spring about said rod between the end thereof and said rock shaft.

58. In a feed mechanism for nut punching machines and the like, in combination, a reciprocating carriage including a base having feed rolls thereon and movable therewith, and a platform for carrying the stock bar, said platform being removably mounted for reciprocation with said base and extending between said feed rolls and said base.

59. In a feed mechanism for nut punching machines and the like, in combination, a reciprocating carriage including a base, feed rolls thereon and movable therewith, means supported by said base for intermittently rotating said feed rolls, said carriage including a platform removably mounted upon said base for reciprocation therewith and extending between said base and said feed rolls, and a hardened steel guide upon said platform for the stock bar.

60. In a feed mechanism for nut punching machines and the like, in combination, a reciprocating carriage including a base having feed rolls thereon and movable therewith, a platform for carrying the stock bar, said platform being removably mounted for reciprocation with said base and extending between said feed rolls and said base, and a gripper jaw unit mounted in advance of said platform for reciprocation therewith.

61. In a feed mechanism for nut punching machines and the like, in combination, a reciprocating carriage including a base having feed rolls thereon and movable therewith, a platform for carrying the stock bar, said platform being removably mounted for reciprocation with said base and extending between said feed rolls and said base, a gripper jaw unit pivoted to the forward end of said platform, and a support for the forward end of said unit.

62. In a nut punching machine, in combination, shearing mechanism and feed mechanism, a common shaft for driving said mechanisms, said feed mechanism comprising a reciprocating carriage including a base having feed rolls thereon and movable therewith and a platform for carrying the stock bar, said platform being removably mounted for reciprocation with said base and extending between said feed rolls and said base, a gripper jaw unit pivoted to the forward end of said platform, a rock shaft in the frame of said shearing mechanism, and a rod for supporting the free end of said gripper unit, said rod extending transversely through said rock shaft.

63. In a feed mechanism for nut punching machines and the like, in combination, a gripper jaw unit for holding a stock bar at a point adjacent the end about to be sheared off, said unit comprising a first jaw, upstanding ears thereon, a second jaw pivoted to said ears to permit feeding the stock bar between said first jaw and said pivot, a fulcrum upon said second jaw, a lever pivoted at said fulcrum, and a spring upon said first jaw for exerting a constant pressure near one end of said lever to provide a constant closing force for said jaw applied at the other end of said lever.

64. In a feed mechanism for stock bars, in combination, a pair of feed rolls, gear mechanism for rotating said rolls, and means for shifting one of said rolls away from the other to disengage the stock bar while retaining the gears of said mechanism in mesh, said means being reversible to permit reengagement of said rolls with the stock bar.

65. In a feed mechanism for stock bars, in combination, a pair of feed rolls, gear mechanism for rotating said rolls, a pivot for one of said rolls parallel to the axis thereof, means pressing said pivoted roll toward its companion roll, a gear coaxial with said pivot, a second gear meshing with said first gear, means for rotating said gears, means for driving said rolls one from each said gears, and means for shifting said pivoted roll about its pivot alternately toward and from said stock bar to alternately grip and release the same.

66. The combination of claim 67 in which the means for shifting the feed roll about its pivot is manually operated to release and reengage the stock bar as desired.

67. In a feed mechanism for nut punching machines and the like, in combination, a platform for mounting a stock bar, a pair of feed rolls upon said platform for gripping the stock bar between them, axles for said rolls extending transversely of said platform, a gear fixed upon each said axle and on the side of said platform opposite that of said feed rolls, said gears being spaced from each other, a pair of driving gears meshing with each other and one with each said first gear, a pivot for one of said rolls coaxial with the corresponding driving gear, means urging said pivoted roll toward its companion, and manual means for slightly displacing said pivoted roll about its pivot to release the stock bar.

68. In a feed mechanism for nut punching machines and the like, in combination, a reciprocating carriage for mounting a stock bar, a pair of feed rolls mounted upon said carriage and gripping the stock bar, means mounted upon said carriage for rotating said rolls, and means mounted upon said carriage for alternately releasing and gripping the stock bar, said feed rolls and all said means reciprocating with said carriage.

69. The combination of claim 70 in which the means for releasing the stock bar is manually actuated.

70. In a machine for punching hexagonal nuts, the combination of a punching die, a stock gauge for the stock bar having a V-shaped vertex to cooperate with the V-shaped notch left in the end of said bar, and a feed mechanism arranged to yieldingly support the part of the stock bar adjacent said stock gauge, whereby said stock gauge will accurately center the portion to be sheared.

71. In a machine for punching hexagonal nuts, the combination of a punching die, a stock gauge for the stock bar having a V-shaped vertex to register with the V-shaped notch left in the end of said bar, a reciprocating feed carriage having pivoted at the forward end thereof an advanced gripper jaw unit and a yielding support for holding said gripper jaw unit near its advanced end.

72. In a machine for punching hexagonal nuts, the combination of a die block, a stock gauge for the stock bar, a V-shaped vertex to register with the notch left in the end of said bar, and a feed mechanism including a supporting platform, feed rolls to grip the stock bar laterally, a gripper jaw unit pivoted to the forward end of said platform to grip the upper and lower surfaces of the stock bar adjacent the end about to be sheared off, and a supporting rod secured to the frame of said die for supporting the forward end of said unit.

73. The method of feeding a stock bar to a nut punching machine consisting of retracting the stock bar after the shearing operation has taken place in order to allow the sheared off blank to drop, then advancing the stock bar by a distance equal to the retraction and the nut diameter combined, while holding said stock bar throughout said operation against deflection out of the line of feed.

Signed at North Tonawanda in the county of Niagara, and State of New York this 19th day of April A. D. 1920.

WILLIAM B. PEIRCE.